(12) United States Patent
Wu et al.

(10) Patent No.: US 11,191,077 B2
(45) Date of Patent: Nov. 30, 2021

(54) ENHANCED DISCOVERY RESOURCE CONFIGURATION WITH STAGGERING FOR DIRECTIONAL VEHICLE TO ANYTHING (V2X)

(71) Applicant: QUALCOMM Incorporated, San Diego, CA (US)

(72) Inventors: Zhibin Wu, Los Altos, CA (US); Jose Edson Vargas, San Diego, CA (US); Sudhir Kumar Baghel, Hillsborough, NJ (US); Shailesh Patil, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/813,164

(22) Filed: Mar. 9, 2020

(65) Prior Publication Data
US 2020/0296661 A1    Sep. 17, 2020

Related U.S. Application Data

(60) Provisional application No. 62/816,807, filed on Mar. 11, 2019.

(51) Int. Cl.
*H04W 72/04* (2009.01)
*H04W 48/16* (2009.01)
(Continued)

(52) U.S. Cl.
CPC ....... *H04W 72/046* (2013.01); *H04L 27/2601* (2013.01); *H04W 16/28* (2013.01);
(Continued)

(58) Field of Classification Search
CPC . H04W 4/40–48; H04W 4/708; H04W 16/28; H04W 48/08–16; H04W 76/10;
(Continued)

(56) References Cited

U.S. PATENT DOCUMENTS

| 2009/0046653 A1* | 2/2009 | Singh | H04W 16/28 370/330 |
| 2011/0305179 A1* | 12/2011 | Wang | H04L 1/1692 370/311 |

(Continued)

OTHER PUBLICATIONS

3GPP TR 38.912: "3rd Generation Partnership Project; Technical Specification Group Radio Access Network; Study on New Radio (NR) Access Technology (Release 15)", 3GPP Standard; Technical Specification; 3rd Generation Partnership Project (3GPP), Mobile Competence Centre; 650, Route Des Lucioles; F-06921 Sophia-Antipolis Cedex; France, vol. TSG RAN, No. V15.0.0 (Jun. 2018), Jul. 19, 2018 (Jul. 19, 2018), pp. 1-74, XP051475046, [retrieved on Jul. 19, 2018] Sections 8.1 and 8.3.1.2.2, p. 18, line 19-p. 30, line 40; p. 36, line 35-p. 38, line 12.

(Continued)

*Primary Examiner* — San Htun
(74) *Attorney, Agent, or Firm* — Patterson & Sheridan, LLP

(57) ABSTRACT

Techniques and apparatus for peer discovery using directional transmissions are described. The techniques described herein may be used by wireless nodes (e.g., vehicles or UEs incorporated in vehicles) for efficient peer discovery in V2X systems.

26 Claims, 14 Drawing Sheets

(51) Int. Cl.
*H04W 4/46* (2018.01)
*H04L 27/26* (2006.01)
*H04W 16/28* (2009.01)
*H04W 76/14* (2018.01)

(52) U.S. Cl.
CPC ........... *H04W 48/16* (2013.01); *H04W 72/04* (2013.01); *H04W 4/46* (2018.02); *H04W 76/14* (2018.02)

(58) Field of Classification Search
CPC ................ H04W 76/11; H04W 76/14; H04W 56/001–0025; H04W 72/02–0466; H04L 27/2601; H04B 7/024; H04B 7/0413; H04B 7/0452; H04B 7/0495
See application file for complete search history.

(56) References Cited

U.S. PATENT DOCUMENTS

| | | | |
|---|---|---|---|
| 2014/0321360 A1* | 10/2014 | Han | H04L 67/10 370/328 |
| 2015/0030015 A1* | 1/2015 | Chu | H04W 72/0406 370/350 |
| 2016/0142898 A1* | 5/2016 | Poitau | H04W 76/14 370/329 |
| 2016/0316442 A1* | 10/2016 | Seo | H04W 56/00 |
| 2016/0330780 A1* | 11/2016 | Kim | H04W 48/16 |
| 2017/0188243 A1* | 6/2017 | Huang | H04W 16/28 |
| 2017/0353984 A1* | 12/2017 | Abdallah | H04B 7/088 |
| 2019/0253955 A1 | 8/2019 | Abedini et al. | |

OTHER PUBLICATIONS

CATT: "Further Design and Evaluation of S-SSB for NR V2X Sidelink", 3GPP TSG RAN WG1 Meeting #96, 3GPP Draft; R1-1901994 Further Design and Evaluation of S-SSB for NR V2X Sidelink Final, 3rd Generation Partnership Project (3GPP), Mobile Competence Centre; 650, Route Des Lucioles; F-06921 Sophia-, vol. RAN WG1, No. Athens, Greece; Feb. 25, 2019-Mar. 1, 2019, Feb. 16, 2019 (Feb. 16, 2019), 15 Pages, XP051599689, Retrieved from the Internet: URL: http://www.3gpp.org/ftp/tsg%5Fran/WG1%5FRL1/TSGR1%5F96/Docs/R1%2D1901994%2Ezip [retrieved on Feb. 16, 2019] Section 2.2. Best Available Date: Feb. 25-Mar. 1, 2019.

Huawei, et al., "Beamforming for V2X Sidelink for FR1 and FR2", 3GPP Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 25, 2019-Mar. 1, 2019, Feb. 15, 2019 (Feb. 15, 2019), XP051600771, 4 Pages. Retrieved from the Internet: URL: http://www.3gpp.org/ftp/tsg%5Fran/WG1%5FRL1%5F96/Docs/R1%2D1903075%2Ezip [retrieved on Feb. 15, 2019] p. 1, line 1-p. 3, line 13. Feb. 25-Mar. 1, 2019.

International Search Report and Written Opinion—PCT/US2020/021792—ISA/EPO—dated Jun. 23, 2020.

* cited by examiner

ENHANCED DISCOVERY RESOURCE CONFIGURATION WITH STAGGERING FOR DIRECTIONAL VEHICLE TO ANYTHING (V2X)

PRIORITY CLAIM(S)

This application claims priority to and the benefit of U.S. Provisional Application No. 62/816,807, filed on Mar. 11, 2019, which is expressly incorporated by reference in its entirety as if fully set forth below and for all applicable purposes.

BACKGROUND

Field of the Disclosure

Aspects of the present disclosure relate to wireless communications, and more particularly, to techniques and apparatus for peer device discovery, for example, in vehicle-to-everything (V2X) communications systems utilizing beamforming.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Vehicle to everything (V2X) communications seek to enable vehicles to communicate with one another to provide a host of services, including vehicle to vehicle communications (V2V), vehicle to infrastructure (V2I) communications, vehicle to grid (V2G) communications and vehicle to people (V2P) communications. Conventional wireless communication relies on network configuring essential physical layer parameter (number of antenna port, number of MIMO layer, MCS, etc.) at a relative slow time scale. Given the high mobility of cars, and the lack of network infrastructure in V2X applications, a more dynamic, autonomous framework should be designed to allow vehicular devices to configure itself with such essential parameters using its own perceived input and the information received from other devices.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide a method for wireless communication by a first wireless node, such as a user equipment (UE) embodied as/incorporated in a vehicle. The method generally includes detecting, during a first portion of a first discovery opportunity, at least one directional preamble sent by a second wireless node via a transmit beam, sending, during a second portion of the first discovery opportunity, a beam response to indicate the detection of the directional preamble during the first portion of the first discovery opportunity, and monitoring, during a second discovery opportunity, for a peer discovery message indicating receipt of the beam response by the second wireless node.

Certain aspects provide a method for wireless communication by a first wireless node, such as a user equipment (UE) embodied as/incorporated in a vehicle. The method generally includes transmitting, during a first portion of a first discovery opportunity, at least one directional preamble via a transmit beam, receiving, during a second portion of the first discovery opportunity, a beam response from a second wireless node to indicate the detection of the directional preamble during the first portion of the first discovery opportunity, and transmitting, during a second discovery opportunity, a peer discovery message indicating receipt of the beam response.

Aspects of the present disclosure also provide various methods, means, and computer program products corresponding to the apparatuses and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
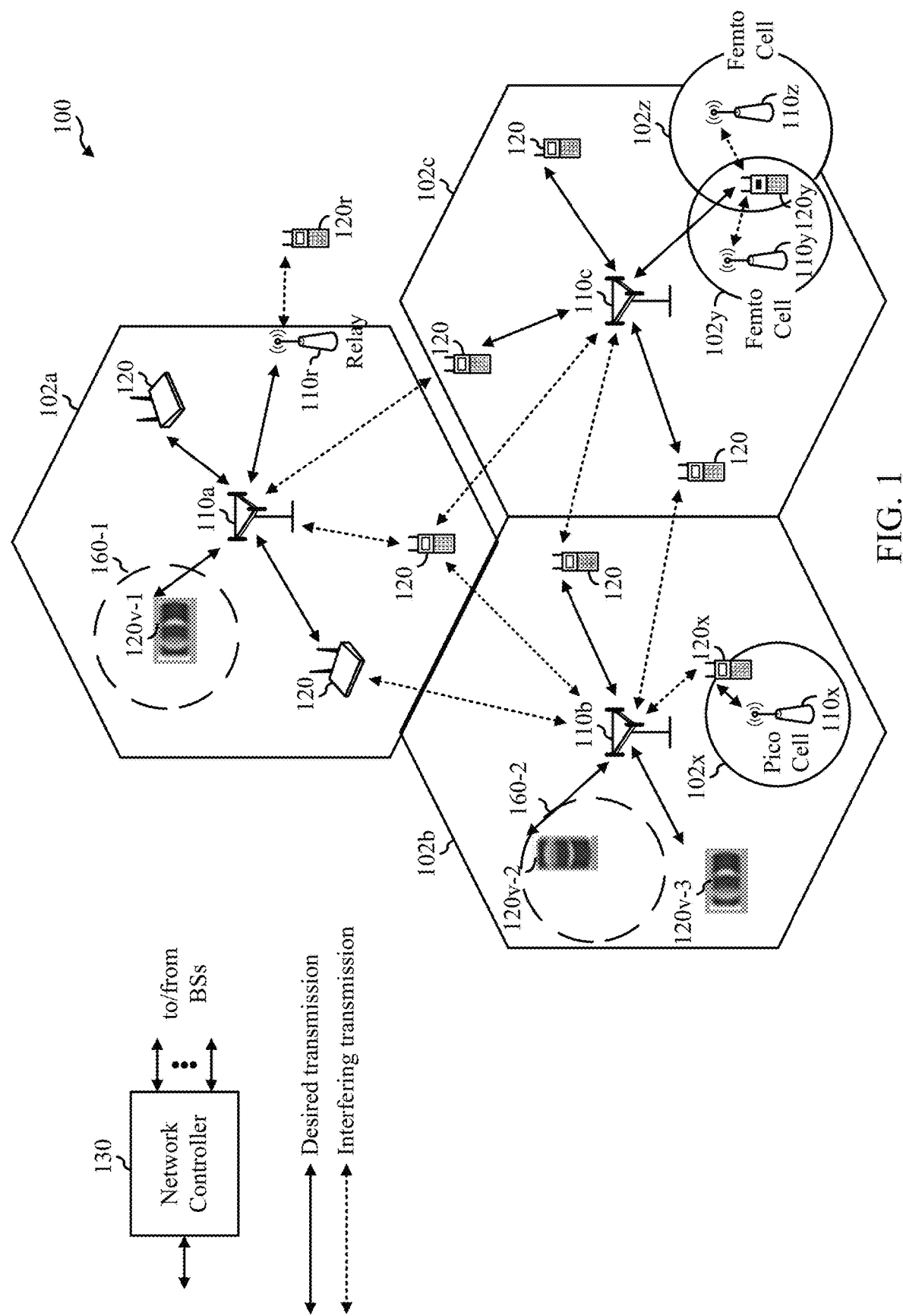
FIG. 1 is a block diagram conceptually illustrating an example telecommunications system, in accordance with certain aspects of the present disclosure.

Aspects of the present disclosure provide techniques for efficient peer discovery in V2X systems. Such peer discovery (e.g., the initial discovery of neighboring vehicles) is an important step to enable further vehicular interactions which may help achieve various objectives of V2X systems, such as collision avoidance and autonomous driving.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 27 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

Example Wireless Communications System

FIG. 1 illustrates an example wireless communication network 100, such as a new radio (NR) or 5G network, in which aspects of the present disclosure may be performed, for example, to perform V2X peer discovery. For example, as illustrated, the wireless communication network 100 may include one or more V2X devices (120v-1, 120v-2, and 120v-3) that can use the techniques presented herein to discover each other.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), NB, new radio base station (NR BS), 5G NB, access point (AP), 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, 120v, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, sub-bands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

Aspects of the disclosure relate to apparatus, methods, processing systems, and computer readable mediums related to new radio V2X (NR V2X) systems as non-limiting examples. Other aspects may be applicable, for example, to LTE-V2X technologies, as a non-limiting example. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
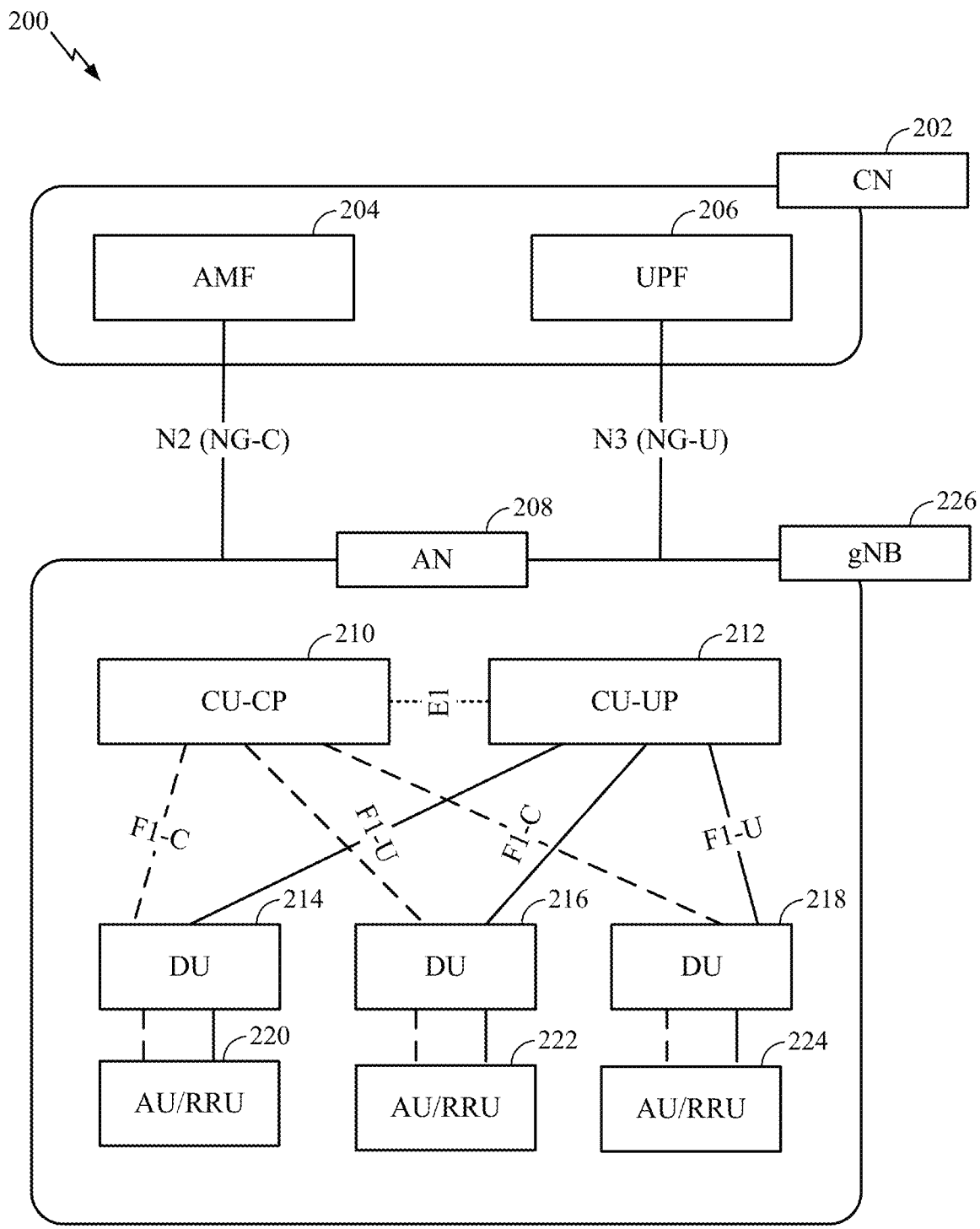
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE).

The CU-UP(s) 212 may be connected to the CU-CP 210. For example, the DU-UP(s) 212 and the CU-CP 210 may be connected via an E1 interface. The CU-CP(s) 212 may connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224. The DU may be connected to an AU/RRU via each of the F1-C and F1-U interfaces.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the N AN and/or UE.

Figure 3:
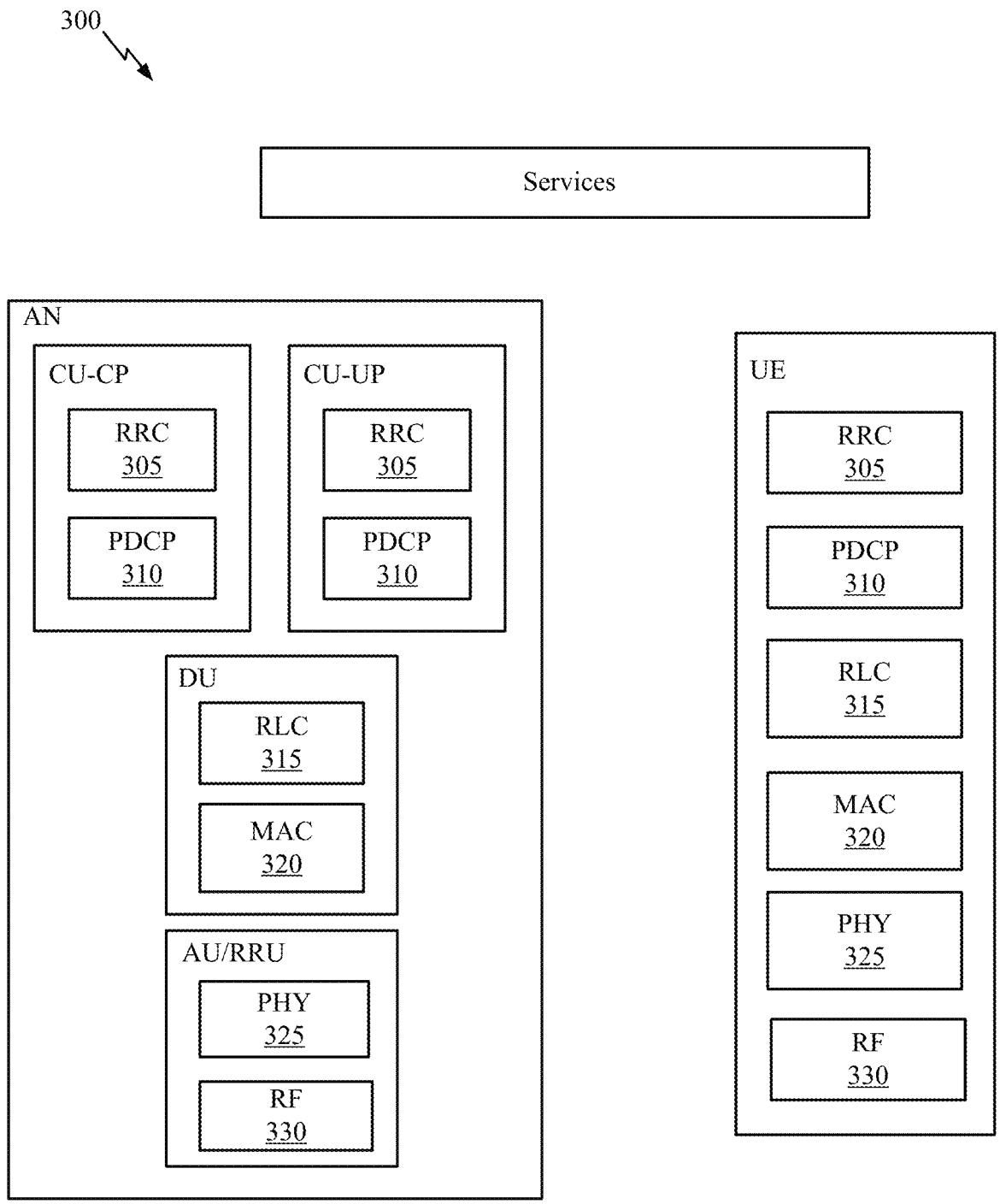
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
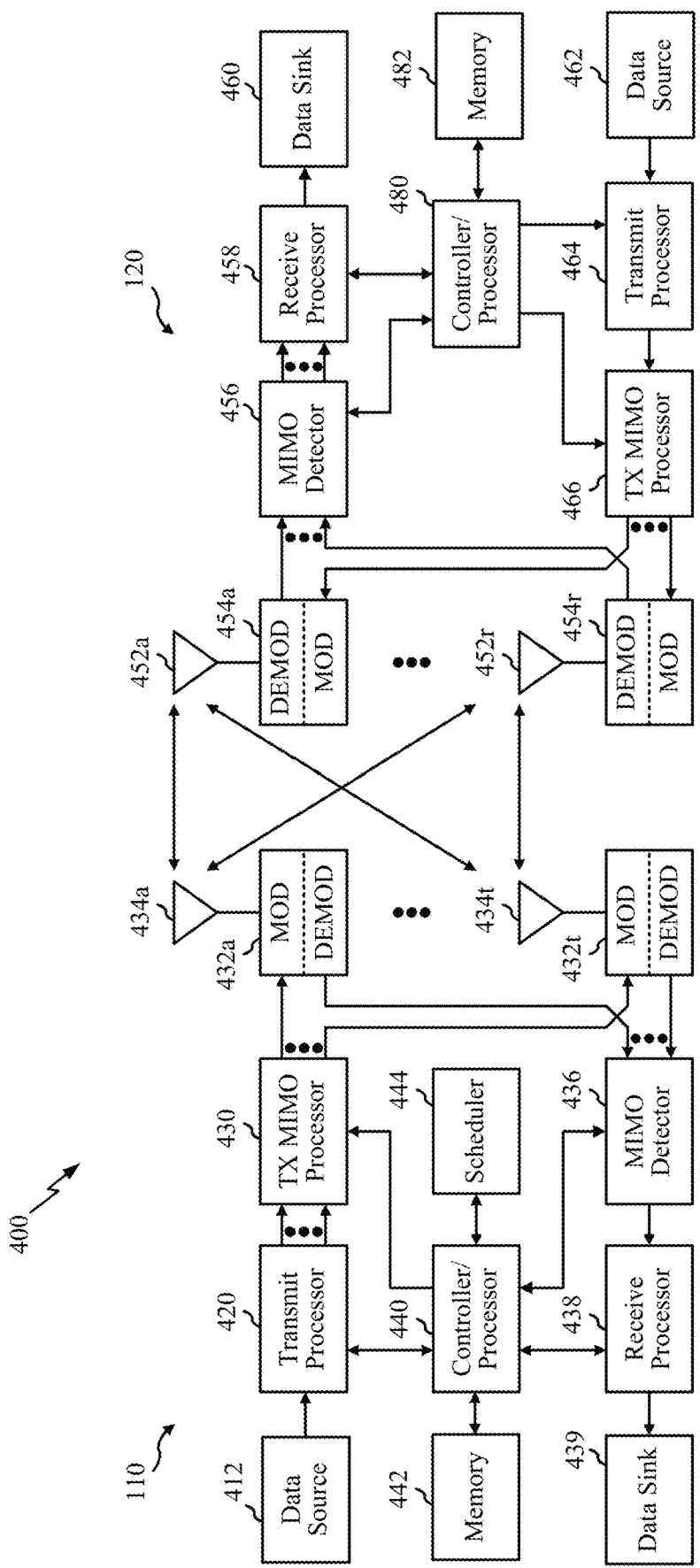
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. As noted above, the BS may include a TRP. One or more components of the UE 120 may be used to practice aspects of the present disclosure. For example, antennas 452, processors 466, 458, 464, and/or controller/processor 480 of the UE 120 may be used to perform the operations described herein and illustrated with reference to FIGS. 9-12, and/or other various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The processor 480 and/or other processors and modules at the UE 120 may perform or direct, e.g., the execution of the functional blocks illustrated in FIGS. 9 and 11-12, and/or other processes for the techniques described herein. The memories 442 and 482 may store data and program codes for BS 110 and UE 120, respectively. A scheduler 444 may schedule UEs for data transmission on the downlink and/or uplink.

Figure 5:
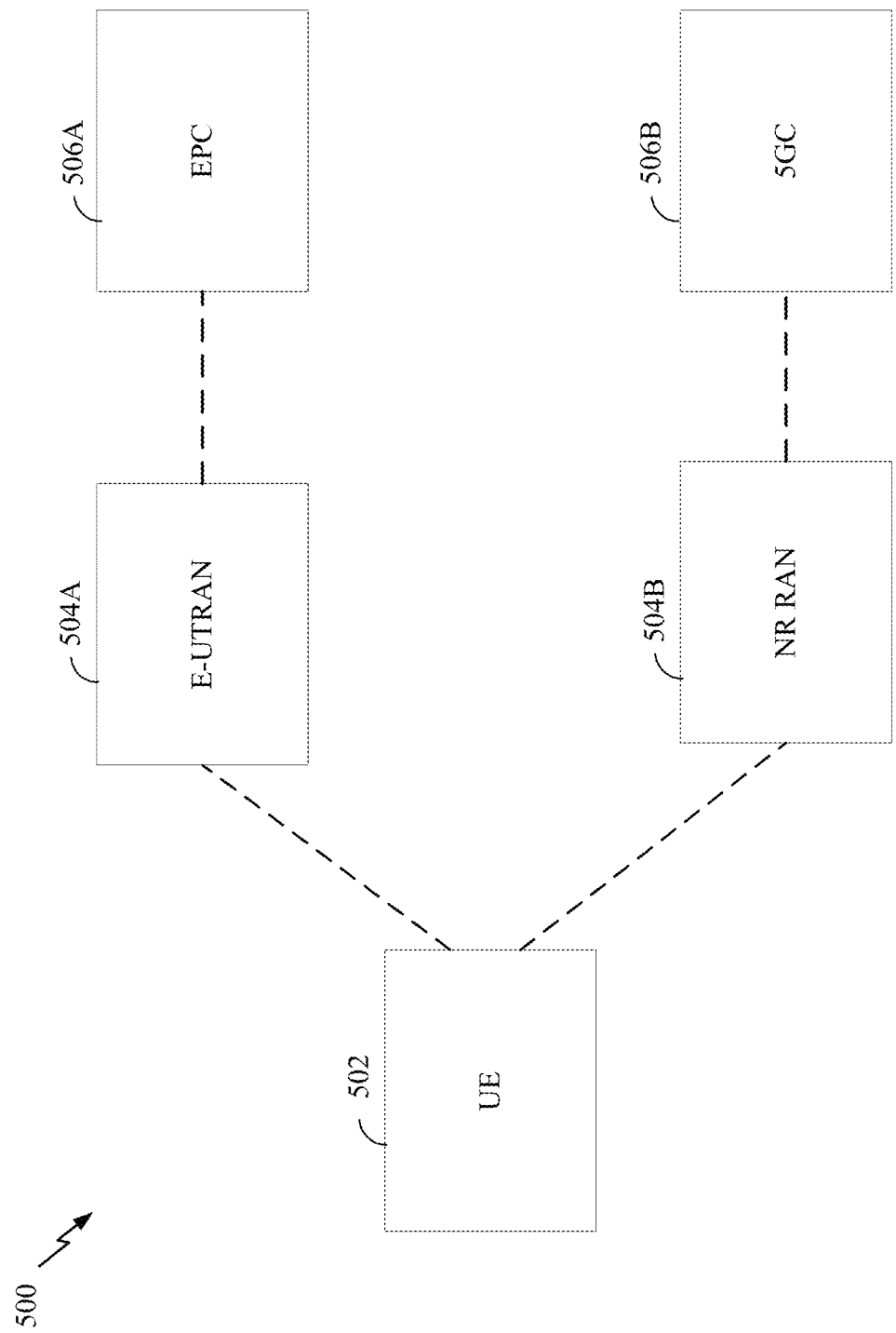
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5GS (e.g., such as the distributed RAN 200) and E-UTRAN-EPC, in accordance with certain aspects of the present disclosure. As shown in FIG. 5, the UE 502 may be served by separate RANs 504A and 504B controlled by separate core networks 506A and 506B, where the RAN 504A provides E-UTRA services and RAN 504B provides 5G NR services. The UE may operate under only one RAN/CN or both RANs/CNs at a time.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
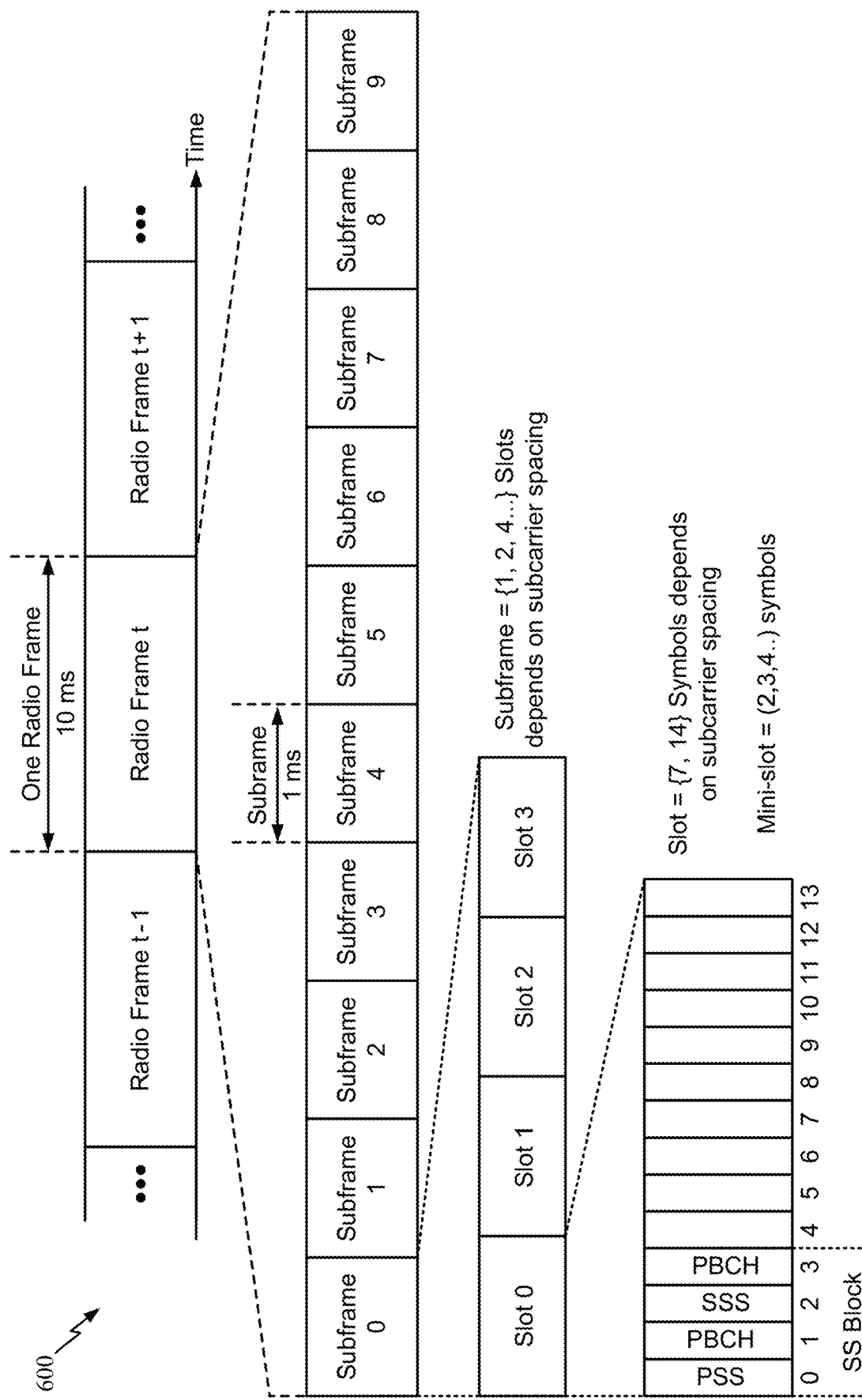
FIG. 6 illustrates an example of a frame format for a telecommunication system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

As noted above, LTE vehicle-to-everything (LTE-V2X) has been developed as a technology to address basic vehicular wireless communications to enhance road safety and the driving experience. In other systems, new radio vehicle-toeverything (NR-V2X) has been developed as an additional technology that covers more advanced communication use case to further enhance road safety and driving experience. Non-limiting embodiments for frequencies covered may be, for example, 3 GHz to 5 GHz. As described below, V2X system methods and apparatus may be applicable to both LTE-V2X and NR-V2X as well as other frequencies. Other frequency spectrums other than those covered by LTE-V2X and NR-V2X are also considered to be applicable to the description and as such, the disclosure should not be considered limiting.

Figure 8:
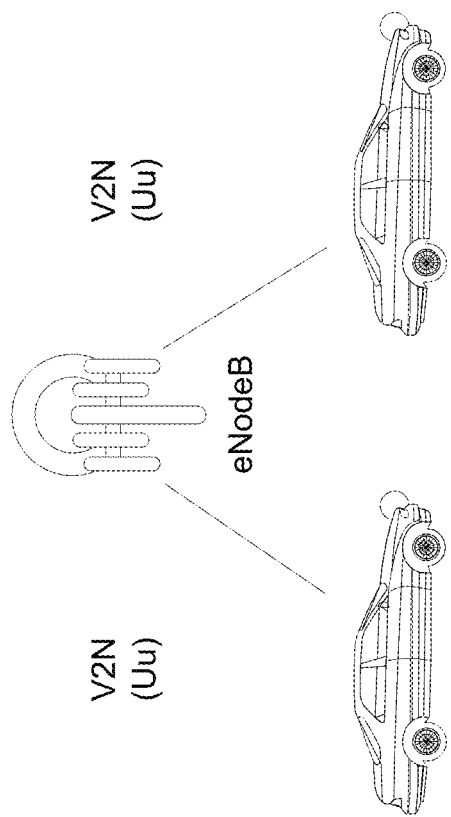
FIG. 8 illustrates a V2X system with network communication between vehicles, in accordance with aspects of the present disclosure.
Figure 7:
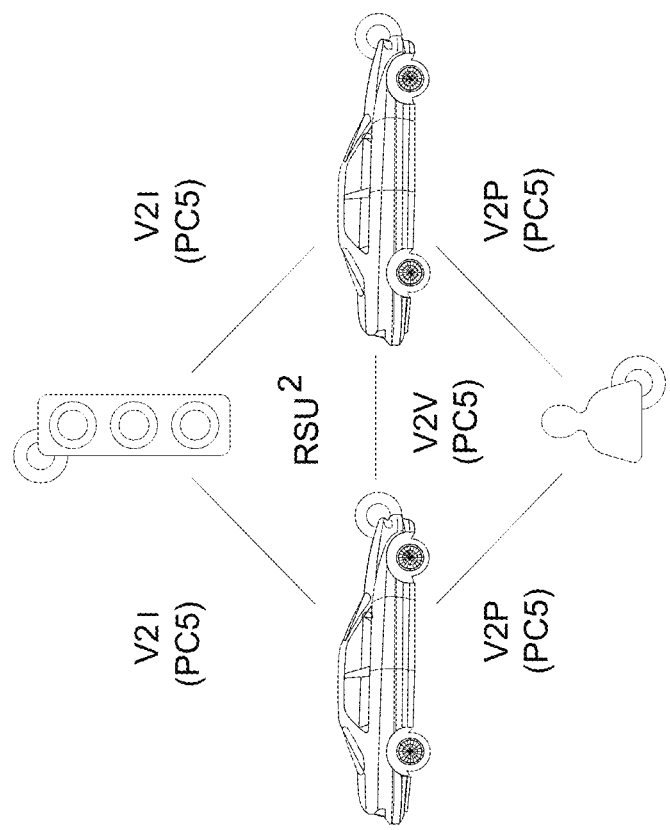
FIG. 7 illustrates a V2X system with direct communication between vehicles, in accordance with aspects of the present disclosure.

Referring to FIG. 7, a V2X system is illustrated with two vehicles. The V2X system, provided in FIGS. 7 and 8, provides two complementary transmission modes. A first transmission mode involves direct communications between participants in the local area. Such communications are illustrated in FIG. 7. A second transmission mode involves network communications through a network as illustrated in FIG. 8.

Referring to FIG. 7, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

In one, non-limiting embodiment, the V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may support advanced safety services in addition to basic safety services described above. In another non-limiting embodiment, the V2X system may be used in a 5G NR V2X configuration, which is configured to interface with a wide variety of devices. By utilizing a 5G NR V2X configuration, multi Gbps rates for download and upload may be provided. In a V2X system that uses a 5G NR V2X configuration, latency is kept low, for example 1 ms, to enhance operation of the V2X system, even in challenging environments.

Referring to FIG. 8, a second of two complementary transmission modes is illustrated. In the illustrated embodiment, a vehicle may communicate with another vehicle through network communications. These network communications may occur through discrete nodes, such as eNodeB, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example V2X Discovery Signaling

Techniques described herein may be used by wireless nodes (e.g., vehicles or UEs incorporated in vehicles) for efficient peer discovery in V2X systems. As noted above, such peer discovery (e.g., the initial discovery of neighboring vehicles) is an important step to enable further vehicular interactions which may help achieve various objectives of V2X systems, such as collision avoidance and autonomous driving. The techniques may be applicable for V2X systems (e.g., NR V2X), and may also be applicable to LTE vehicle-to-everything (LTE-V2X) technologies to address vehicular wireless communications to enhance road safety and the driving experience.

Challenges for peer discovery may depend, to some extent, on the operating band. For example, in the sub 6 GHz band, peer discovery may be accomplished by broadcasting discovery or probe signals with omni-directional antennas (effectively transmitting the discovery signals in all directions). While this approach addresses the challenge of finding a possible communication partner, it does not address the challenge of determining the best directional communication beam, or beam pair link (BPL) for communicating between the device transmitting the discovery signals and the device detecting the discovery signals.

In contrast, in the mmW band, directional discovery signals are sent using (sweeping) diffusing transmit beams.

Due to the directional nature of stand-alone mmW V2V/V2X communications, in addition to identifying a possible communication peer, the discovery procedures may also help identify a preferred BPL (TX beam and RX beam).

Figure 9:
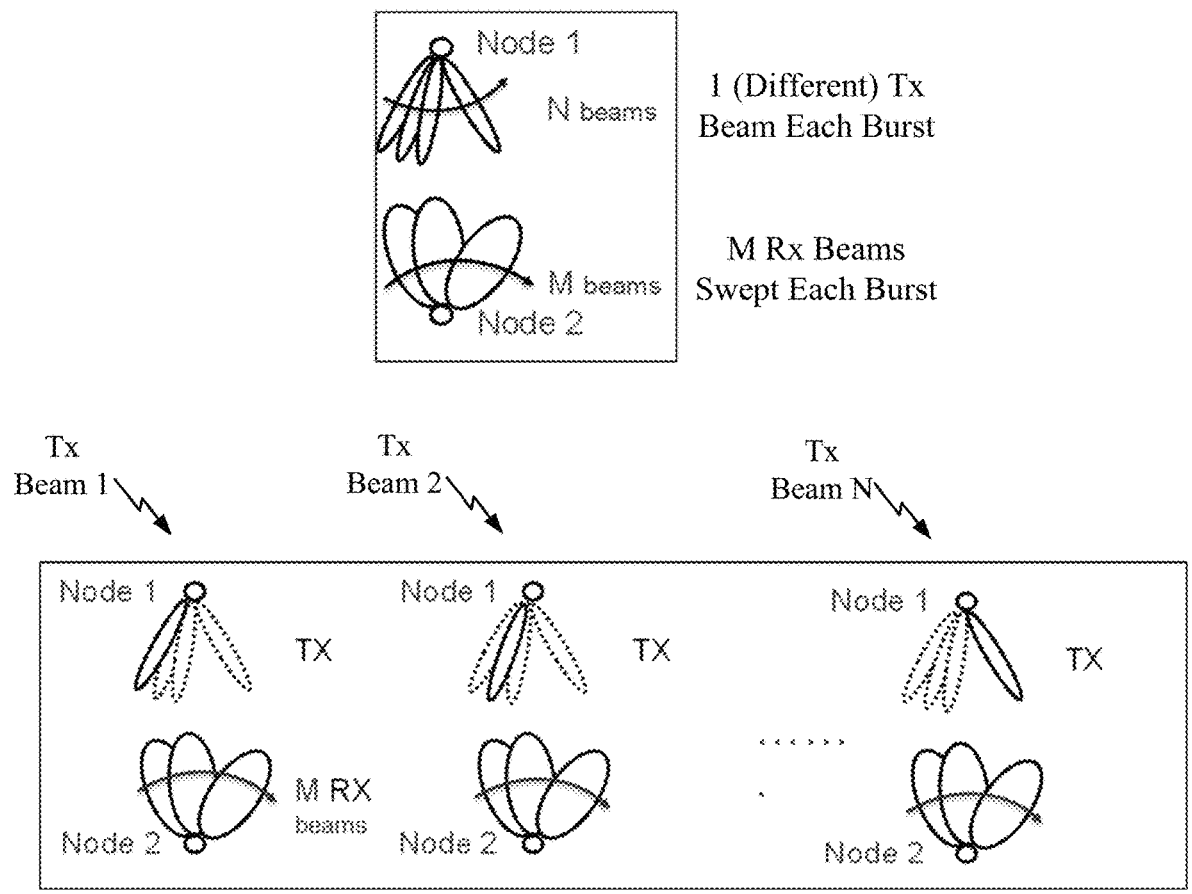
FIG. 9 illustrates one example approach for discovery for a V2X system, in accordance with aspects of the present disclosure.

As illustrated in FIG. 9, the preferred BPL may be identified by transmitting a burst of discovery signals using a single Tx beam by a first wireless node (labeled Node 1) while sweeping Rx beams at a second wireless node (labeled Node 2). As illustrated, Node 1 may transmit each burst of discovery signals using a different Tx beam, cycling through N Tx beams in N bursts, while Node 2 cycles through M Rx beams each burst.

Figure 10:
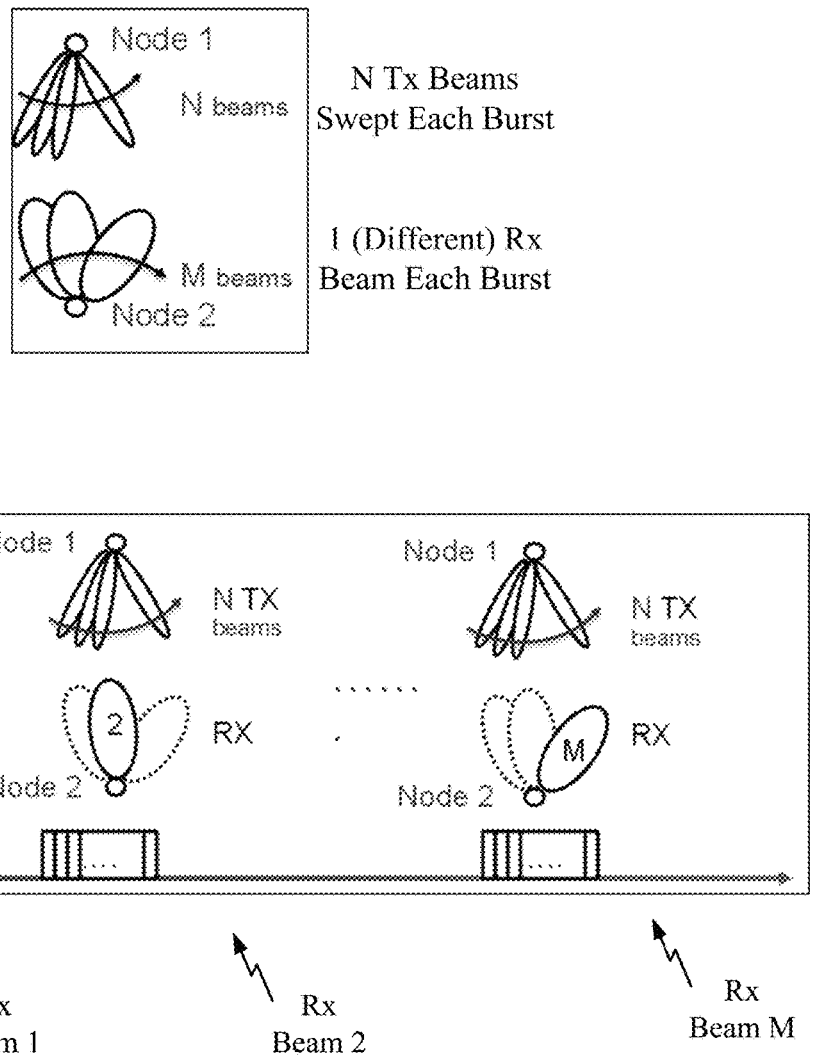
FIG. 10 illustrates another example approach for discovery for a V2X system, in accordance with aspects of the present disclosure.

As illustrated in FIG. 10, an alternate approach to identifying the preferred BPL is for Node 1 to sweep across different Tx beams for each discovery signal within a burst, while Node 2 uses a single Rx beam each burst. As illustrated, Node 1 may sweep across N Tx beams each burst of discovery signals while Node 2 uses a different (single) one of the M Rx beams each burst.

Figure 11:
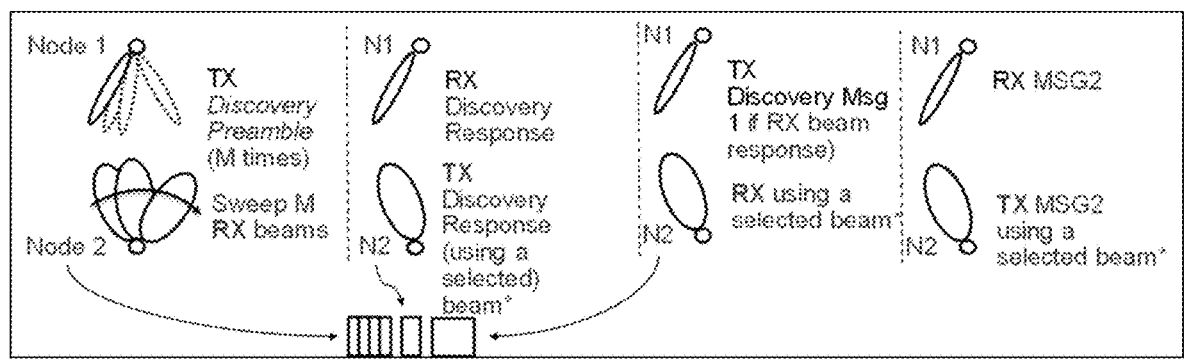
FIG. 11 illustrates still another example approach for discovery for a V2X system, in accordance with aspects of the present disclosure.

In some cases, to reduce overhead, different types of discovery signals may be transmitted during a discovery procedure. For example, as shown in FIG. 11, relatively short discovery preambles may be sent as a burst (e.g., similar to the SSB shown in FIG. 6), shown as Step 1. Once a receiving device (e.g., Node 2) detects a preamble and determines a suitable BPL the receiving device may send a beam response (e.g., a discovery or beam response message), at Step 2, to the transmitting device using a selected beam. The beam discovery response message basically indicates Node 2 was able to detect a preamble sent with one Tx beam with suitable power/quality on at least one of its Rx beams. Upon receiving the beam discovery response message, at Step 3, Node 1 may then transmit an additional peer discovery message (referred to herein as a V2X MSG1) with additional details (e.g., information identifying Node 1, location information and/or capabilities of Node 1). In some cases, the additional peer discovery message (V2X MSG1) may include an inquiry about Node 2 (e.g., to see if Node 2 is a suitable candidate for some type of desired communications). Upon receipt of the V2X MSG1, at Step 4, Node 2, if interested, may send a response message (referred to herein as a V2X MSG2) acknowledging receipt of the V2X MSG1, indicating these two devices may communicate in unicast mode using the BPL identified during the discovery process. The response message (V2X MSG2) may indicate additional details about Node 2 (e.g., information identifying Node 2, location information and/or capabilities of Node 2).

Using this approach, the V2X MSG1 (Peer Discovery Message) part can be transmitted less frequently than the Discovery Preamble, conditional on receipt of a beam response message, which reduces overhead and air interface resource utilization. In other words, this resource savings is achieved by transmitting the Peer Discovery Message part (V2X MSG1) only if there is a target device (in the corresponding Tx beam direction), as indicated by receipt of the beam response message (may have a format similar to a PRACH).

Aspects of the present disclosure may help address this joint problem of discovering a peer and determining a BPL by providing a discovery procedure that efficiently uses discovery resources. The techniques presented herein may efficiently use discovery bursts, such as those described above, to allow for early feedback. The early feedback may be used for efficient reconfiguration and may result in power savings, for example, allowing both transmitting and receiving devices to stop beam sweeping, change from Tx to Rx (half-duplex), and reconfigure a sweeping pattern.

Figure 12:
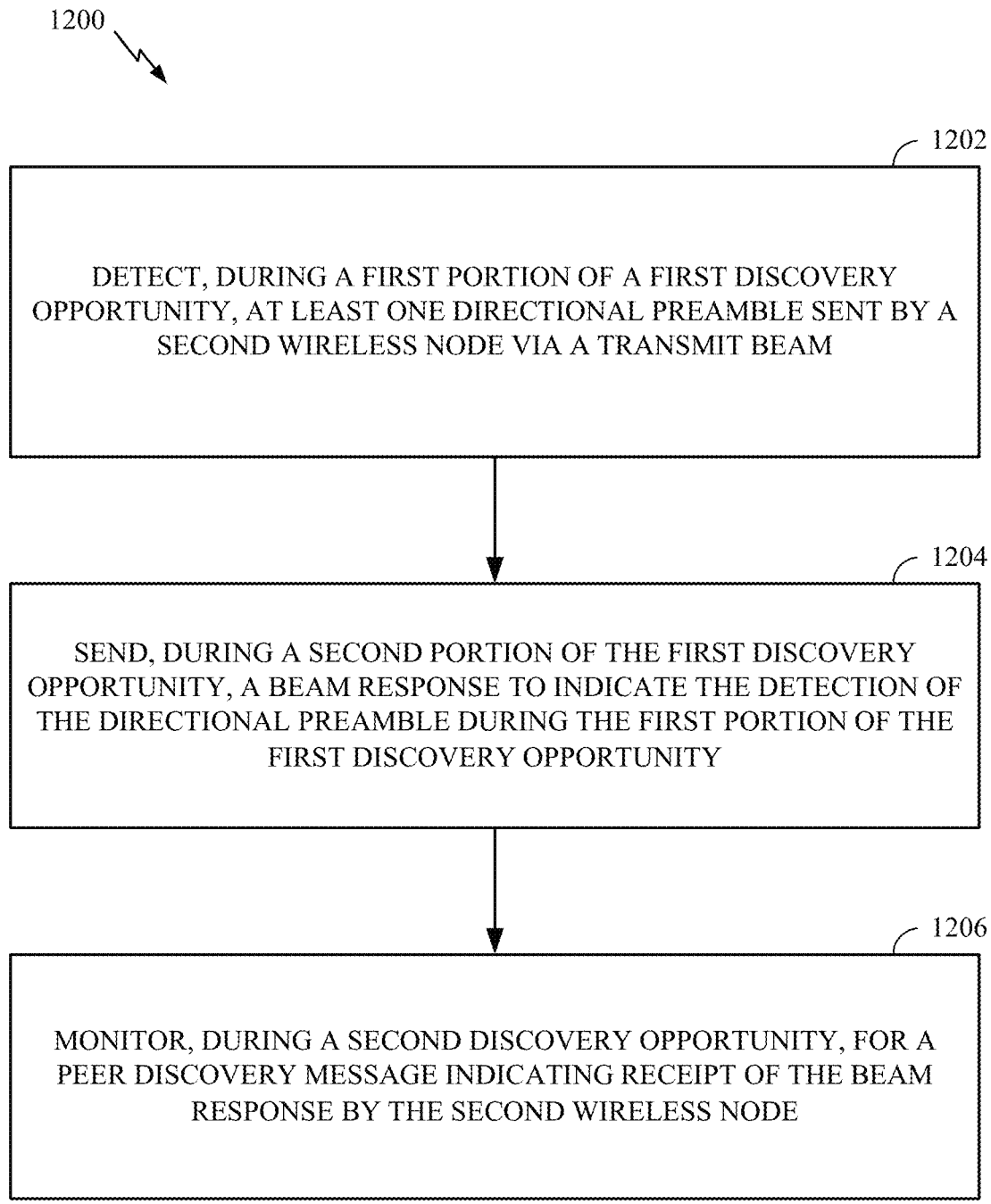
FIG. 12 is a flow diagram illustrating example operations for wireless communications, e.g., in a V2X system, in accordance with certain aspects of the present disclosure.

FIG. 12 illustrates example operations 1200 for wireless communications, in accordance with aspects of the present disclosure. Operations 1200 may be performed, for example, by a first wireless device, such as a UE (e.g., a V2X UE 120v shown in FIG. 1, which may correspond to Rx Node 2 shown in FIGS. 9-11).

Operations 1200 begin, at 1202, by detecting, during a first portion of a first discovery opportunity, at least one directional preamble sent by a second wireless node via a transmit beam. As will be described in greater detail below, with reference to FIGS. 15 and 16, the first discovery Opportunity may correspond to a Discovery Burst with symbols for Preambles/Response for a (Tx) beam index k (and Peer Discovery Message for beam index k−1).

At 1204, the first wireless device sends, during a second portion of the first discovery opportunity, a beam response to indicate the detection of the directional preamble during the first portion of the first discovery opportunity. At 1206, the first wireless device monitors, during a second discovery opportunity, for a peer discovery message indicating receipt of the beam response by the second wireless node. As will be described in greater detail below, with reference to FIGS. 15 and 16, the second discovery Opportunity may correspond to a discovery Burst with symbols for a Peer Discovery Message for beam index k (and Preambles/Response for beam index k+1).

Figure 13:
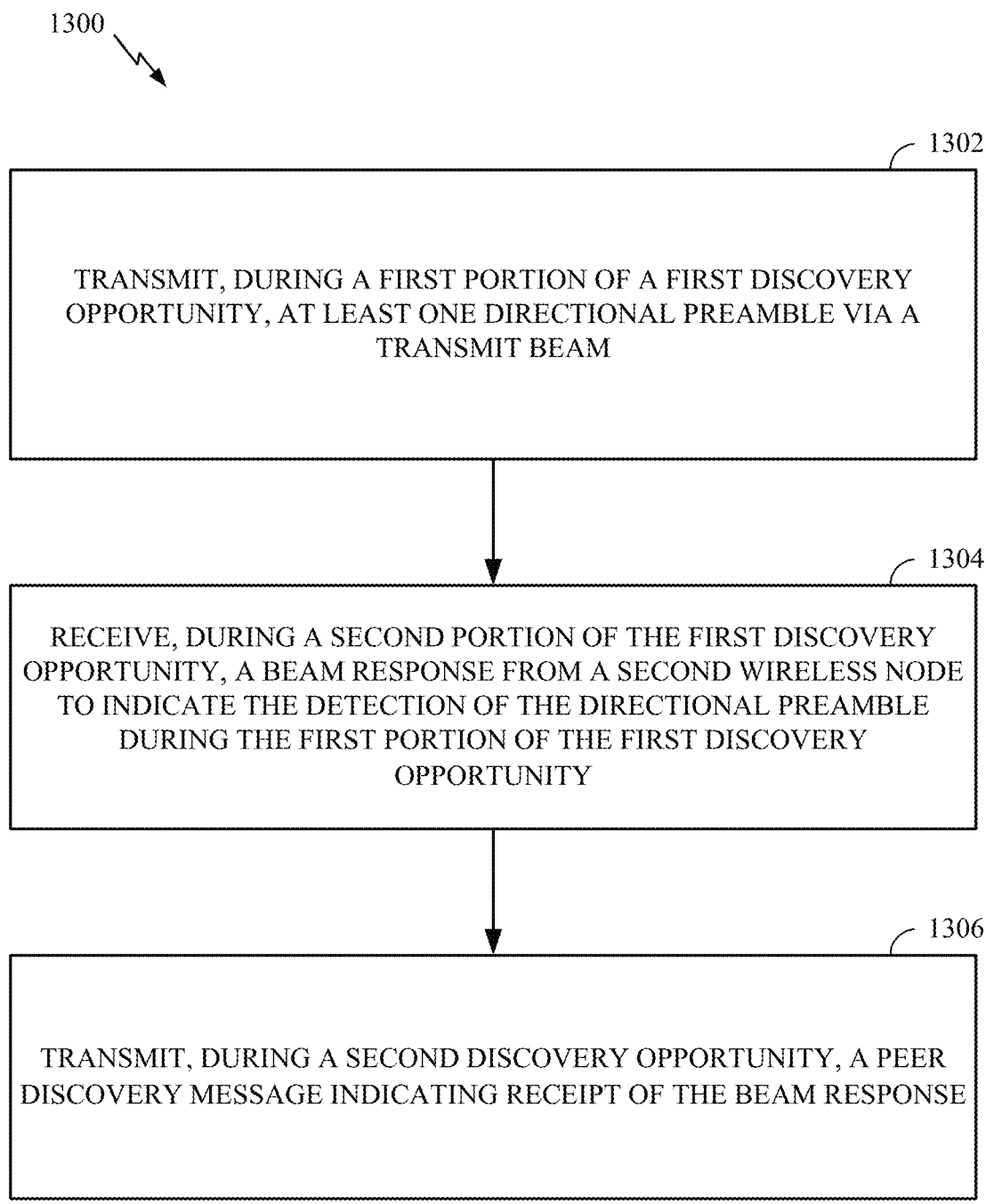
FIG. 13 is a flow diagram illustrating example operations for wireless communications, e.g., in a V2X system, in accordance with certain aspects of the present disclosure.

FIG. 13 illustrates example operations 1300 for wireless communications, in accordance with aspects of the present disclosure, that may be considered Tx-side operations complementary to the Rx-side operations 1200 described above. In other words, operations 1200 may be performed, for example, by a wireless device (e.g., a V2X UE 120v shown in FIG. 1 which may correspond to Tx Node 1 shown in FIGS. 9-11) that is transmitting discovery bursts (monitored for/received by a device performing operations 1200).

Operations 1300 begin, at 1302, by transmitting, during a first portion of a first discovery opportunity, at least one directional preamble via a transmit beam. At 1304, the first wireless device receives, during a second portion of the first discovery opportunity, a beam response from a second wireless node to indicate the detection of the directional preamble during the first portion of the first discovery opportunity. At 1306, the first wireless device transmits, during a second discovery opportunity, a peer discovery message indicating receipt of the beam response.

Of course, a wireless device may change roles, alternating between performing operations 1200 and 1300. In other words, the same device may, at certain times transmit discovery signals according to operations 1300 (so that device can be discovered) and, at other times, monitor for discovery signals according to operations 1200 (in order to discover other devices).

Figure 14:
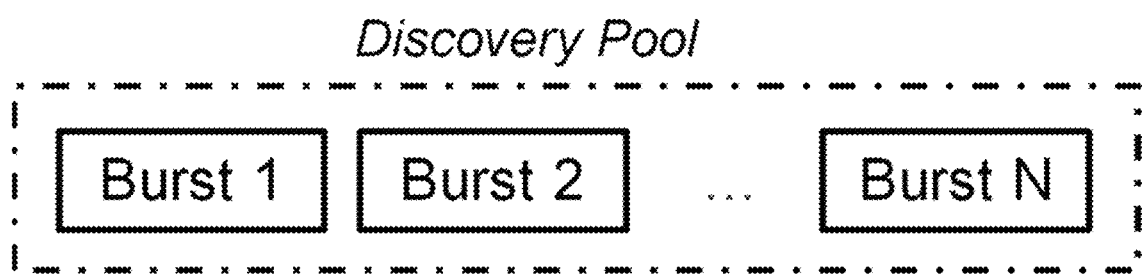
FIG. 14 illustrates example discovery bursts that may contain discovery signals and messages, in accordance with certain aspects of the present disclosure.

As illustrated in FIG. 14, resources may be provided for non-overlapping bursts of discovery signals (preambles/responses/peer discovery messages) sent using time division multiplexing (TDM). As described above, devices participating in the discovery process may transition from transmitting to receiving for different bursts and at different portions within a burst.

Figure 15:
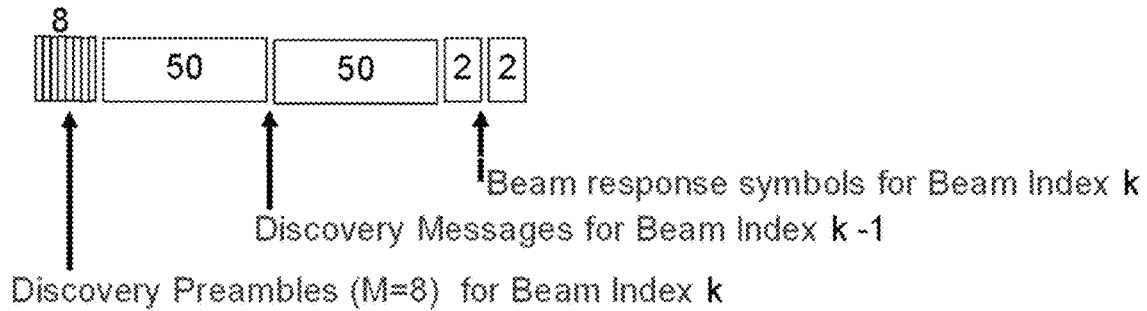
FIG. 15 illustrates an example structure for discovery in a V2X system, in accordance with certain aspects of the present disclosure.

As illustrated in FIG. 15, different sets of symbols of a discovery burst may be allocated for different symbols. For example, a first set of symbols may be allocated for the transmission of discovery preambles (by a transmitting device such as Node 1 in FIGS. 9-11) for a beam index k, a second set of symbols may be allocated for the transmission of peer discovery messages (by the transmitting device) but for a previous beam index k−1, while a third set of symbols may be allocated for the transmission of a beam/discovery response (by a receiving device such as Node 2 in FIGS. 9-11) for beam index k.

In other words, in one burst, both discovery preambles and corresponding discovery responses are sent for one beam (k), while peer discovery messages for a previous beam (k−1) are sent. As a result of this pipelined manner of operation, in which successive beams are evaluated, device discovery and BPL establishment may be performed more efficiently than if only a single beam were evaluated at a time. In other words, if a transmitting device were to use a single beam to send discovery preambles, then wait for the receiving device to send a response for that same beam before sending preambles using a next beam, or before sending a peer discovery message for a previous beam, the symbol durations are essentially wasted. In other words, 2 discovery opportunities are required for each N beam evaluated, requiring 2N discovery opportunities to evaluate N beams. The pipelined approach herein, however, allows the same N beams to be effectively used for both device discovery and BPL detection in only N+1 discovery opportunities.

Figure 16:
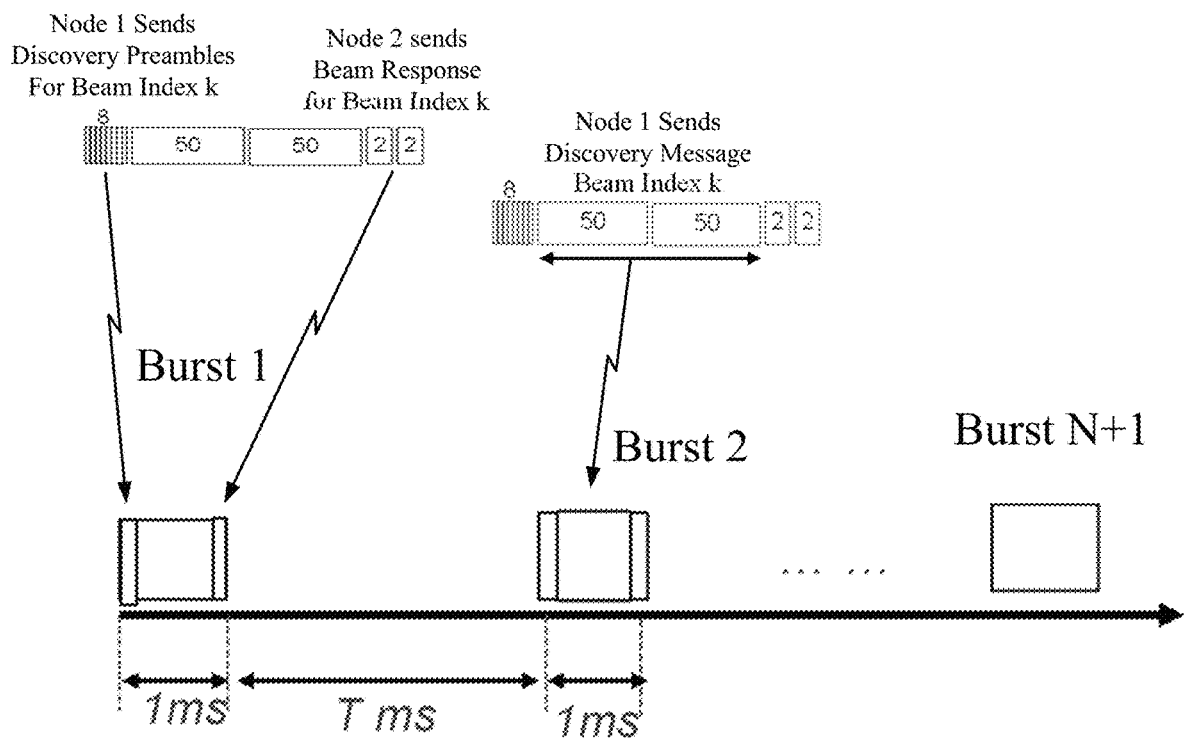
FIG. 16 illustrates how different discovery signals are transmitted in different bursts, in accordance with certain aspects of the present disclosure.

This is illustrated in greater detail in FIG. 16. As illustrated, at the beginning of a first discovery burst (Burst 1), Node 1 sends discovery preambles using Tx beam k. At the end of Burst 1, assuming Node 2 has detected one of the discovery preambles, Node 2 sends a beam response message for (indicating it received a preamble sent using) beam k. In response to receiving the beam response message, Node 1 then sends a peer discovery message (e.g., V2X MSG1). More generally, by provided a sufficient number of symbols (as described below) the V2X MSG1 pool may allow for reception of MSG1 from alternative devices-other than just Node 1.

To generalize, for each beam direction, Tx preambles are sent at the beginning of Burst k, while Rx beam responses are sent at the end of Burst k. Tx Peer Discovery messages are sent in the next Burst k+1. Assuming a delay T between bursts, the discovery delay in each direction is T+1 ms. Assuming N directions, an additional burst (Burst N+1) would be need to finish discovery for N directions.

The value of the delay T may be selected such that it is not too large, because in mobile-to-mobile communications the beam direction may shift (e.g., T may be 2, 4, 5, or 8 ms). The total number of symbols of a burst, as well as the number of symbols allocated for each different type of signal, may depend on subcarrier spacing (SCS). For example, for a 120 Khz SCS, a 1 ms burst may contain 112 OFDM symbols, with 8 symbols used for discovery preambles, 100 (50+50) symbols used for transmission of a peer discovery message, and 4 symbols used for transmission of a discovery/beam response message. As another example, for a 600 Khz SCS, a 1 ms burst may contain 56 OFDM symbols, with 8 symbols used for discovery preambles, 44 (22+22) symbols used for transmission of a peer discovery message, and 4 symbols used for transmission of a discovery/beam response message. As noted above, this substantial number of symbols (100 in these examples) allocated for the peer discovery messages may accommodate reception or transmission of 2 or more peer discovery messages.

As described above, aspects of the present disclosure provide a discovery procedure that can be used in beamformed mmW V2X applications. The discovery procedure generally involves determining the Beam Pair Link (BPL) using discover preambles (e.g., sequences similar to SSBs in NR 15) for fixed-to-mobile communications and using a peer discovery message (e.g., similar to the V2X Discovery Message of R15 V2X communications).

Splitting the discovery signal in components, as described herein, allows initial BPL determination first and the discovery of the communication peer second, which may improve V2X SideLink physical resources usage during the peer discovery process. As described above, one specific option for the discovery procedure resource configuration involves a staggering approach between beam Discovery Preambles, peer Discovery Messages, and Beam Response symbols (as shown in FIGS. 15 and 16). Such a method supporting multiple SCS numerologies.

Using the techniques presented herein, Discovery Bursts may be transmitted alternatively with V2X user data (e.g., V2X user data may be sent in the delay period T between discovery bursts). Such a method can accommodate a single beam discovery burst per subframe or can be extended to accommodate multiple discovery bursts across subframes forming a pool of beam discovery resources in between V2X user data.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for signaling, means for indicating, means for assigning, means for providing, means for retrieving, means for interacting, means for negotiating, means for exchanging, means for communicating, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for identifying, means for determining, means for negotiating, means for agreeing, means for signaling, means for storing, means for interacting, means for configuring, means for generating, means for assigning, means for providing, means for updating, means for modifying, means for changing, means for selecting, means for performing, means for using, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 12-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized. For example, processors 466, 458, 464, and/or controller/processor 480 of the UE 120 may be configured to perform operations 1200 and/or 1300 of FIGS. 12 and/or 13.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first wireless node, comprising:
   detecting, during a first portion of a first discovery opportunity, at least one directional preamble sent by a second wireless node via a transmit beam, wherein the first discovery opportunity comprises a first plurality of symbols and the first portion comprises a first set of symbols of the first plurality of symbols;
   sending, during a second portion of the first discovery opportunity, a beam response to indicate the detection of the directional preamble during the first portion of the first discovery opportunity, wherein:
      the second portion comprises a second set of symbols of the first plurality of symbols,
      the first discovery opportunity comprises a third portion, including a third set of symbols of the first plurality of symbols, between the first portion and the second portion, and the third portion is allocated for transmission of peer discovery messages corresponding to a discovery opportunity prior to the first discovery opportunity; and
   monitoring, during a second discovery opportunity after the first discovery opportunity, for a peer discovery message indicating receipt of the beam response by the second wireless node, wherein the second discovery opportunity comprises a second plurality of symbols.

2. The method of claim 1, further comprising determining a configuration of resources for the first discovery opportunity and the second discovery opportunity.

3. The method of claim 1, wherein:
   the first set of symbols, the second set of symbols, and the third set of symbols are based on at least one numerology dependent parameter.

4. The method of claim 3, wherein the numerology dependent parameter comprises sub carrier spacing (SCS).

5. The method of claim 1, wherein a plurality of directional preambles within a burst are sent by the second wireless node in the first portion via a same transmit beam.

6. The method of claim 1, wherein a plurality of directional preambles within a burst are sent by the second wireless node via a set of transmit beams.

7. The method of claim 1, further comprising at least one of sending or receiving user data between discovery opportunities.

8. The method of claim 1, wherein the second wireless node transmits discovery preambles using a single transmit beam for a discovery opportunity per subframe.

9. The method of claim 1, wherein the second wireless node transmits discovery preambles using different transmit beams for discovery opportunities across a plurality of subframes.

10. The method of claim 1, further comprising:
    transmitting, during the first portion of a discovery opportunity, at least one directional preamble via a transmit beam.

11. A method for wireless communications by a first wireless node, comprising:
    transmitting, during a first portion of a first discovery opportunity, at least one directional preamble via a transmit beam, wherein the first discovery opportunity comprises a first plurality of symbols and the first portion comprises a first set of symbols of the first plurality of symbols;
    receiving, during a second portion of the first discovery opportunity, a beam response from a second wireless node to indicate detection of the directional preamble during the first portion of the first discovery opportunity, wherein:
       the second portion comprises a second set of symbols of the first plurality of symbols,
       the first discovery opportunity comprises a third portion, including a third set of symbols of the first plurality of symbols, between the first portion and the second portion, and
       the third portion is allocated for transmission of peer discovery messages corresponding to a discovery opportunity prior to the first discovery opportunity; and
    transmitting, during a second discovery opportunity after the first discovery opportunity, a peer discovery message indicating receipt of the beam response, wherein the second discovery opportunity comprises a second plurality of symbols.

12. The method of claim 11, further comprising determining a configuration of resources for the first discovery opportunity and the second discovery opportunity.

13. The method of claim 11, wherein:
    the first set of symbols, the second set of symbols, and the third set of symbols are based on at least one numerology dependent parameter.

14. The method of claim 13, wherein the numerology dependent parameter comprises sub carrier spacing (SCS).

15. The method of claim 11, wherein a plurality of directional preambles within a burst are sent by the first wireless node in the first portion via a set of transmit beams.

16. The method of claim 11, further comprising at least one of sending or receiving user data between discovery opportunities.

17. The method of claim 11, wherein the first wireless node transmits discovery preambles using a single transmit beam for a discovery opportunity per subframe.

18. The method of claim 11, wherein the first wireless node transmits discovery preambles using different transmit beams for discovery opportunities across a plurality of subframes.

19. The method of claim 11, further comprising:
monitoring, during the first portion of a discovery opportunity, for at least one directional preamble sent from another wireless node via a transmit beam.

20. An apparatus for wireless communications by a first wireless node, comprising:
a receiver configured to detect, during a first portion of a first discovery opportunity, at least one directional preamble sent by a second wireless node via a transmit beam, wherein the first discovery opportunity comprises a first plurality of symbols and the first portion comprises a first set of symbols of the first plurality of symbols;
a transmitter configured to send, during a second portion of the first discovery opportunity, a beam response to indicate the detection of the directional preamble during the first portion of the first discovery opportunity, wherein:
the second portion comprises a second set of symbols of the first plurality of symbols,
the first discovery opportunity comprises a third portion, including a third set of symbols of the first plurality of symbols, between the first portion and the second portion, and
the third portion is allocated for transmission of peer discovery messages corresponding to a discovery opportunity prior to the first discovery opportunity; and
at least one processor configured to monitor, during a second discovery opportunity after the first discovery opportunity, for a peer discovery message indicating receipt of the beam response by the second wireless node, wherein the second discovery opportunity comprises a second plurality of symbols.

21. The apparatus of claim 20, wherein the at least one processor is further configured to determine a configuration of resources for the first discovery opportunity and the second discovery opportunity.

22. The apparatus of claim 20, wherein:
the first set of symbols, the second set of symbols, and the third set of symbols are based on at least one numerology dependent parameter.

23. The apparatus of claim 22, wherein the numerology dependent parameter comprises sub carrier spacing (SCS).

24. An apparatus for wireless communications by a first wireless node, comprising:
a transmitter configured to transmit, during a first portion of a first discovery opportunity, at least one directional preamble via a transmit beam, wherein the first discovery opportunity comprises a first plurality of symbols and the first portion comprises a first set of symbols of the first plurality of symbols; and
a receiver configured to receive, during a second portion of the first discovery opportunity, a beam response from a second wireless node to indicate detection of the directional preamble during the first portion of the first discovery opportunity, wherein:
the second portion comprises a second set of symbols of the plurality of first symbols,
the first discovery opportunity comprises a third portion, including a third set of symbols of the first plurality of symbols, between the first portion and the second portion, and
the third portion is allocated for transmission of peer discovery messages corresponding to a discovery opportunity prior to the first discovery opportunity,
the transmitter is also configured to transmit, during a second discovery opportunity after the first discovery opportunity, a peer discovery message indicating receipt of the beam response, and
the second discovery opportunity comprises a second plurality of symbols.

25. The apparatus of claim 24, further comprising further comprising at least one processor configured to determine a configuration of resources for the first discovery opportunity and the second discovery opportunity.

26. The apparatus of claim 24, wherein:
the first set of symbols, the second set of symbols, and the third set of symbols are based on at least one numerology dependent parameter.

* * * * *